United States Patent [19]
Ozawa et al.

[11] 4,127,743
[45] Nov. 28, 1978

[54] MUTING CIRCUIT FOR LOUDSPEAKER

[75] Inventors: Akio Ozawa; Susumu Seyoshi, both of Tokyo, Japan

[73] Assignee: Pioneer Electronic Corporation, Tokyo, Japan

[21] Appl. No.: 873,763

[22] Filed: Jan. 30, 1978

[30] Foreign Application Priority Data

Jan. 28, 1977 [JP] Japan .................................. 52-8312

[51] Int. Cl.² .......................................... H04R 3/00
[52] U.S. Cl. .................................... 179/1 A; 325/478
[58] Field of Search ............... 179/1 R, 1 A, 1 SW, 179/1 VL; 325/478

[56] References Cited

U.S. PATENT DOCUMENTS

| | | | |
|---|---|---|---|
| 3,622,900 | 11/1971 | Hanus et al. | 325/478 |
| 3,840,820 | 10/1974 | Kawada | 325/478 |
| 3,916,321 | 10/1975 | Morse | 325/478 |
| 3,965,295 | 6/1976 | Evans et al. | 179/1 A |

FOREIGN PATENT DOCUMENTS 2,409,887  9/1974  Fed. Rep. of Germany .......... 179/1 A Primary Examiner—George G. Stellar
Attorney, Agent, or Firm—Sughrue, Rothwell, Mion, Zinn and Macpeak

[57] ABSTRACT

A muting circuit for loudspeakers is operable to disconnect a loudspeaker from an amplifier immediately upon a power supply being interrupted. The muting circuit includes an around-zero-volt detection circuit for detecting around the zero volt level of a commercial AC voltage. An RC time constant circuit is controlled by the output of the around-zero-volt detection circuit to either charge or discharge the capacitor in the RC time constant circuit only when the around zero volt level is detected. A threshold circuit is connected to the RC time constant circuit and operates a loudspeaker relay when the charge on the capacitor either exceeds or decreases below a predetermined level.

6 Claims, 5 Drawing Figures

MUTING CIRCUIT FOR LOUDSPEAKER

BACKGOUND OF THE INVENTION

This invention relates to a muting circuit for loudspeakers which operates to immediately detect the interruption of a power supply to deenergize a loudspeaker relay coil.

The ideal operation of a muting circuit for loudspeakers is for there to be a predetermined time delay before the loudspeaker relay coil is energized after the power switch is turned on, but when the power switch is turned off, the relay coil is immediately deenergized. In a conventional muting circuit of this type, a delay circuit is provided for delay operation effected when the power switch is turned off, or the power supply is interrupted. Therefore, the start of the muting operation is somewhat delayed because of the provision of the delay circuit when the power supply is interrupted. Accordingly, even if the power switch is turned off, the loudspeaker is still operated for a while; that is, the loudspeaker produces unpleasant transient sounds such as pop sounds and distored signals caused when the power supply is interrupted.

SUMMARY OF THE INVENTION

Accordingly, an object of this invention is to eliminate the aforementioned difficulty accompanying the conventional muting circuit.

According to the invention, there is provided a muting circuit which comprises an around-zero-volt detection circuit for detecting around the zero volt level of a commercial AC voltage. An RC time constant circuit includes a capacitor whose charge or discharge is controlled by the output of the around-zero-volt detection circuit. A threshold circuit is connected to the RC time constant circuit so that the variation in charge on the capacitor provides an indication as to whether a power supply is interrupted or not. The threshold circuit controls a loudspeaker relay driving circuit so that the loudspeaker can be immediately disconnected when the power supply is interrupted.

BRIEF DESCRIPTION OF THE DRAWINGS

In the drawings:

FIGS. 2(a), 2(b) and 2 (c) are timing charts for a description of the operation of a muting circuit according to the invention; and FIG. 3 is a circuit diagram showing another embodiment of the invention.

DESCRIPTION OF THE PREFERRED EMBODIMENTS

Figure 1:
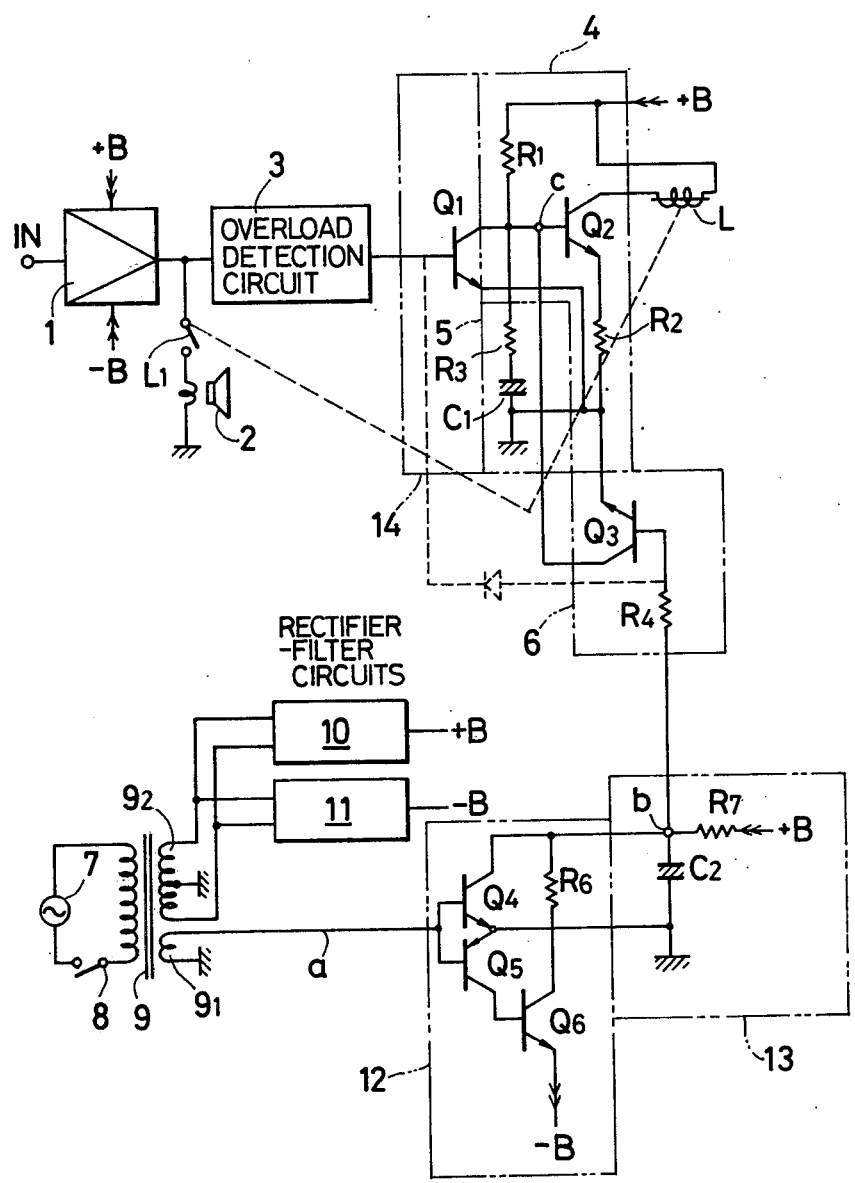
FIG. 1 is a circuit diagram showing one embodiment of this invention.

Referring to FIG. 1, an audio signal is applied to a power amplifier 1 through its input terminal IN, the output of which is applied to a DC voltage overload detection circuit 3 and to a loudspeaker 2 through a relay contact $L_1$. The output of the circuit 3 is applied to a transistor Q1 in a switching circuit 14. The collector of the transistor Q1 is connected to a transistor Q2 in a relay driving circuit 4, so as to control the transistor Q2. The relay driving circuit 4 comprises the transistor Q2 and resistors R1 and R2. A relay coil L is connected between the collector of the transistor Q2 and a DC power source +B. A delay circuit made up of a series circuit of a resistor R3 and a capacitor C1 is connected to the base of the transistor Q2, and furthermore the collector of a transistor Q3 in a switching circuit 6 is connected to the base of the transistor Q2.

A commercial AC power source 7, such as 50 Hz or 60 Hz 100 V power source, forms a loop with a power switch 8 and the primary winding of a transformer 9. Commercial AC voltages which have been sutiably decreased are provided on the secondary windings $9_1$ and $9_2$ of the transformer 9. The secondary winding $9_2$ is connected to a rectifier-filter circuit 10 to obtain a DC power source +B and to a rectifier-filter circuit 11 to obtain a DC power source −B. On the other hand, the secondary winding $9_1$ is connected to a circuit 12 which operates to detect voltage around the commercial AC voltage 0 volt level and which also serves as a discharge circuit (hereinafter referred to as "an around-zero-volt detection and discharge circuit 12" when applicable). This circuit 12 comprises transistors Q4 and Q5 and a resistor R6. The collector of the transistor Q4 is connected to the hot terminal of a capacitor C2 of an integration circuit 13, which is made up of a time constant circuit including a resistor R7 and the capacitor C2. The connection point between the resistor R7 and the capacitor C2 is connected to the base of the transistor Q3 in the switching circuit 6.

The operation of the circuitry thus organized will now be described. When the power switch 8 is turned on, the DC voltage +B and −B are provided by the rectifier-filter circuits 10 and 11, respectively, and are applied to the various circuits. Upon application of the DC voltage to the relay driving circuit 4, energization of the relay coil L is delayed with a time constant determined by the resistor R1, the resistor R3 and the capacitor C1 in the delay circuit 5. A predetermined period of time after the power switch 8 has been turned on, the relay contact $L_1$ is closed, thereby connecting the loudspeaker 2 to the output of amplifier 1. If an output DC voltage or overload of the power amplifier 1 is detected by the DC voltage overload detection circuit 3, the output thus detected renders the transistor Q1 in the switching circuit 14 conductive, and therefore the transistor Q2 in the relay driving circuit 4 is rendered nonconductive. As a result, the relay coil L is deenergized so that the output of the power amplifier 1 is electrically disconnected from the loudspeaker 2, whereby the power amplifier 1 and the loudspeaker 2 are protected.

Figures 2A, 2B, 2C, 3:
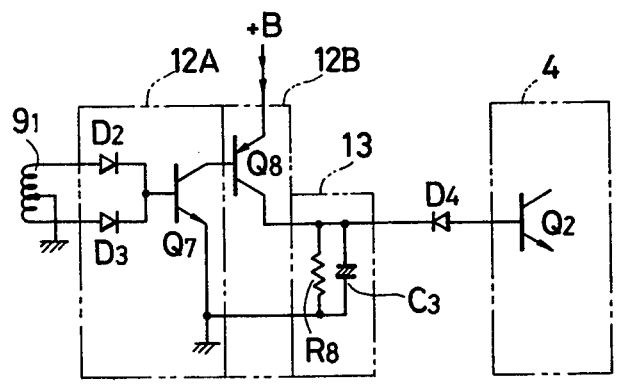

On the other hand, while the power switch 8 is maintained closed, a voltage having a waveform such as that shown in FIG. 2(a) is provided by the secondary winding $9_1$ of the transformer 9. Therefore, when the voltage provided by the secondary winding $9_1$ is around zero volt, the around-zero-volt detection and discharge circuit 12 renders all of the transistors Q4 through Q6 nonconductive, and discharge is not effected. At other times, the transistor Q4 or the transistors Q5 and Q6 are rendered conductive according to the polarity of the voltage, thereby discharging the capacitor C2. The voltage waveform obtained at the point b is as shown in FIG. 2(b), and therefore the transistor Q3 in the switching circuit 6 is not rendered conductive. When the power switch 8 is turned off at the time instant $t_1$ in FIG. 2(a), the transistors Q4 through Q6 in the around-zero-volt detection and discharge circuit 12 are rendered non-conductive, and therefore the voltage developed at the point b is increased with a time constant determined by the resistor R7 and the capacitor C2. When the voltage exceeds the threshold voltage of the transistor Q3 in the switching circuit 6, the transistor Q3 is rendered conductive, the point c of the relay driving circuit 4 is grounded, and the relay coil L is deenergized. The time constant determined by the resistor R7 and the capacitor C2 in the integration circuit is so defined that in normal operation with power switch 8 turned on, the point b does not exceed the threshold voltage of the transistor Q3. Accordingly, the capacitance of the capacitor C2 is small, and the time constant thereof is set small. Thus, the period of time of from the time instant $t_1$ when the power switch is turned off to the time instant $t_2$ when the relay coil L is deenergized is within one period of the AC voltage frequency.

In FIG. 1, two switching circuits 6 and 14 are employed; however, if the output of the integration circuit 13 is connected to the input of the switching circuit 14 through a diode $D_1$ as indicated by the dotted line, one switching circuit 14 can serve the same function as the two switching circuits.

Shown in FIG. 3 is a modification of the around-zero-volt detection and discharge circuit 12 and the integration circuit 13. In this case, the center tap of the secondary winding $9_1$ of the transformer 9 is grounded, and the voltage developed on the secondary winding is subjected to full-wave rectification with diodes D2 and D3. A switching transistor Q7 is rendered conductive and non-conductive (on and off) around the zero volt level of the rectified voltage waveform.

That is, an around-zero-volt detection circuit 12A for detecting around the zero volt level is made up of the diodes D2 and D3 and the transistor Q7, and a charge circuit 12B is made up of a transistor Q8. The charge circuit is controlled by the output of the around-zero-volt detection circuit 12A so that charge current is applied to an integration circuit forming a time constant circuit with a resistor R8 and a capacitor C3. The hot terminal of the capacitor C3 is connected through a diode D4 to the base of the relay driving circuit 4, and therefore the relay voltage of the capacitor.

In operation, the around-zero-volt detection circuit 12A detects around the zero volt level of the commercial AC voltage provided through the two terminals of the secondary winding of the transformer 9. When the transistor Q7 is rendered non-conductive around the zero volt level, the charge circuit 12B is also rendered non-conductive, and during this period charging the capacitor C3 in the integration circuit 13 is suspended, while the charge voltage of the capacitor C3 is discharged to ground through resistor R8. Normally, when the power switch is maintained closed (on), the capacitor C3 is charged by the charge circuit before the voltage is dropped to a value set by the discharge time constant determined by the capacitor C3 and the resistor R8, and therefore the voltage across the capacitor C3 will never drop below the set value. Immediately when the power switch is turned off, the around-zero-volt detection circuit 12A detects the zero volt level to render the transistor Q8 in the charge circuit 12B non-conductive thereby blocking the flow of charge current. Thereafter, when the voltage across the capacitor C3 becomes lower than the set value, the diode D4 is rendered conductive (on), and the transistor Q2 in the relay driving circuit 4 is rendered non-conductive, thereby deenergizing the relay L.

As is apparent from the above-described embodiments, the around-zero-volt detection circuit and the charge or discharge circuit may be separated from each other or may be combined together. Furthermore, either the charge circuit or the discharge circuit can be connected to the integration circuit. Conventional circuits can be employed as the around-zero-volt detection circuit to achieve the same object.

As is apparent from the above description, in the invention, whether the power switch is off or not is detected for every period of the commercial voltage frequency to control the relay driving circuit. Therefore, when the power switch is turned off, the muting operation can be effected much sooner than the prior art.

What is claimed is:

1. A muting circuit for loudspeakers comprising:
    a relay switch for connecting a loudspeaker to an amplifier;
    an around-zero-volt detection circuit for detecting around the zero volt level of a commercial AC voltage;
    an RC time constant circuit controlled by the output of said around-zero-volt detection circuit; and
    a relay driving circuit controlled by said RC time constant circuit for controlling said relay switch.

2. A muting circuit for loudspeakers as claimed in claim 1 in which said around-zero-volt detection circuit comprises a full-wave rectifier circuit connected to a transistor switching circuit.

3. A muting circuit for loudspeakers as claimed in claim 1 further comprising a threshold circuit connected to said RC time constant circuit, wherein said relay driving circuit is connected to said threshold circuit and said threshold circuit detects according to the variation in the output level of said RC time constant circuit whether a power supply is interrupted or not, so as to control said relay driving circuit.

4. A muting circuit for loudspeakers as claimed in claim 3 in which said around-zero-volt detection circuit comprises a full-wave rectifier circuit connected to a transistor switching circuit.

5. A muting circuit for loudspeakers as claimed in claim 3 in which said RC time constant circuit comprises a resistor and a capacitor, said capacitor being charged through said resistor only when the around-zero-volt level is detected by said around-zero-volt detection circuit, said threshold circuit detecting when the charge on said capacitor exceeds a predetermined level.

6. A muting circuit for loudspeakers as claimed in claim 3 in which said RC time constant circuit comprises a resistor and a capacitor, said capacitor being discharged through said resistor only when the around-zero-volt level is detected by said around-zero-volt detection circuit, said threshold circuit detecting when the charge on said capacitor decreases below a predetermined level.

* * * * *